June 28, 1927.
N. R. HAAS
1,633,740
DYNAMO BRUSH
Filed Dec. 1, 1924
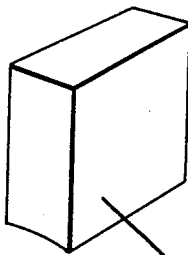
GRAPHITE
SODIUM CHLORIDE
SILICA
Inventor
Nelson R. Haas Patented June 28, 1927.

1,633,740

UNITED STATES PATENT OFFICE.

NELSON ROBERT HAAS, OF DAYTON, OHIO, ASSIGNOR, BY MESNE ASSIGNMENTS, TO DELCO-REMY CORPORATION, OF DAYTON, OHIO, A CORPORATION OF DELAWARE.

DYNAMO BRUSH.

Application filed December 1, 1924. Serial No. 753,407.

This invention relates to brushes for dynamo electric machines, and includes among its objects providing a brush which is durable, which will not deposit graphite appreciably upon the commutator and which will not unduly wear the commutator during the life of the brush.

Further objects and advantages of the present invention will be apparent from the following description of a preferred form thereof.

The accompanying drawing illustrates the brush.

The present invention consists in the making of a brush composed of graphite and an abrasive substance which will function also as a binder. For this purpose finely divided silica distributed among the particles of graphite will serve as a binder and abrasive. Hydrated silica or silicic acid is mixed with graphite and moulded under pressure and heat sufficient to dehydrate the silicic acid and leave silica among the particles of graphite in such a fine state of subdivision that the graphite particles will be bound together.

Silicic acid can be obtained by reacting a solution of sodium silicate with commercial hydrochloric acid. Preferably the sodium silicate solution is about 40% solution corresponding with approximately 37° Baumé. This solution is combined with hydrochloric acid in the proportion of 9 parts of sodium silicate to 1 part of hydrochloric acid. This reaction precipitates silicic acid mixed with sodium chloride,—a jelly like substance.

The mixture of sodium chloride and silicic acid is dried at room temperature in fairly dry atmosphere in order to dissipate the excess water. After drying, this mixture is ground and mixed with the graphite in a dry state by the operation of a ball mill for approximately one hour. The proportions of this mixture which have been found satisfactory are, by weight, substantially 85% graphite and 15% of the mixture of sodium silicate and silicic acid.

To form a brush, a predetermined quantity of this mixture is placed in a steam heated die and a pressure of about 3000 lbs. per square inch is applied while the die is heated by steam pipes thermally connected to the die and carrying about 130 lbs. per square inch steam pressure. The corresponding temperature will be about 350° F. The material in the die is subjected to this heat and pressure for about six minutes. The heat dehydrates the silicic acid leaving an insoluble solid including graphite and finely divided silica. Sodium chloride is also present in the brush, and is believed to have a beneficial function as a binder.

A dynamo brush made by the foregoing process has been found to have many desirable characteristics. It will not absorb oil to any substantial amount. It will not smudge the commutator, that is, deposit particles of free graphite which, if mixed with oil on the commutator, would interfere with the passage of electric current. It will place a reasonable amount of polish on the commutator and will not wear the commutator appreciably.

Although the proportions of 85% graphite and 15% of the mixture of sodium chloride and silicic acid have been found desirable, it will be understood that within the reasonable limits other proportions will be found satisfactory. It is obvious that the quantity of the mixture of sodium chloride and silicic acid must be sufficient to provide the binder for the particles of graphite, and to supply a sufficient quantity of abrasive material, which is desirable in brushes, in order to avoid brush squeak, which occurs when using a brush containing no abrasive.

While the form of embodiments of the present invention as herein disclosed, constitute preferred forms, it is to be understood that other forms might be adopted, all coming within the scope of the claims which follow:

What is claimed is as follows:

1. The method of making a dynamo brush which consists in mixing graphite and silicic acid in a dry state, and in moulding the mixture under heat and pressure.

2. The method of making a dynamo brush which consists in combining a solution of sodium silicate with hydrochloric acid to form a mixture of sodium chloride and silicic acid, in drying this mixture and in mixing it with graphite in a dry state and in moulding the latter mixture under heat and pressure.

3. The method of making a dynamo brush which consists in mixing in a dry state approximately 15% by weight of the reaction product of sodium silicate and hydrochloric acid with approximately 85% graphite, and in moulding this mixture under heat and pressure.

4. A dynamo brush including graphite and silica.

5. A dynamo brush comprising graphite, sodium chloride and silica.

In testimony whereof I hereto affix my signature.

NELSON ROBERT HAAS.